United States Patent [19]

Schutts

[11] Patent Number: 5,021,737
[45] Date of Patent: Jun. 4, 1991

[54] PROXIMITY SENSOR RESISTANT TO AXIAL AND TORSIONAL FORCES

[75] Inventor: Mark E. Schutts, Reno, Nev.

[73] Assignee: Bently Nevada Corporation, Minden, Nev.

[21] Appl. No.: 318,133

[22] Filed: Mar. 2, 1989

[51] Int. Cl.$^5$ .................. G01B 7/14; G01R 33/00; G01H 11/00; G01N 9/18

[52] U.S. Cl. .................. 324/207.11; 324/207.26; 324/262; 73/661; 73/866.5

[58] Field of Search .............. 324/207, 208, 173, 174, 324/234, 236, 262; 336/30, 45, 65, 92; 73/661, 866.5

[56] References Cited

U.S. PATENT DOCUMENTS 4,563,643 1/1986 Leschek et al. .................. 324/207

Primary Examiner—Walter E. Snow
Attorney, Agent, or Firm—Flehr, Hohbach, Test, Albritton & Herbert

[57] ABSTRACT

A proximity sensor has a metal case with a sensing coil at one end and a coaxial cable extending out the other end for placement in proximity to rotating machinery to sense imbalances by position change of, for example, a shaft. The sensor includes a cylinder integrally molded with a plastic bobbin which carries the coil on its end. This unitary assembly then has inserted in it the coaxial cable and the typically wire braided outer conductor is soldered onto the cylinder to provide a permanent interlock resistance against axial and torsional forces. A plastic insulating cap is placed over the entire assembly including the sensing coil and epoxied thereto. A sleeve over the junction between the cable and cylinder prevents unwanted epoxy from filling the coaxial cable. Finally, this permanent affixing of the cap allows the metal casing normally having a nut and thread to be crimped onto a notch in the cap. Moisture proofing is also provided by injection of silicone rubber in the cavity of the bobbin.

5 Claims, 4 Drawing Sheets

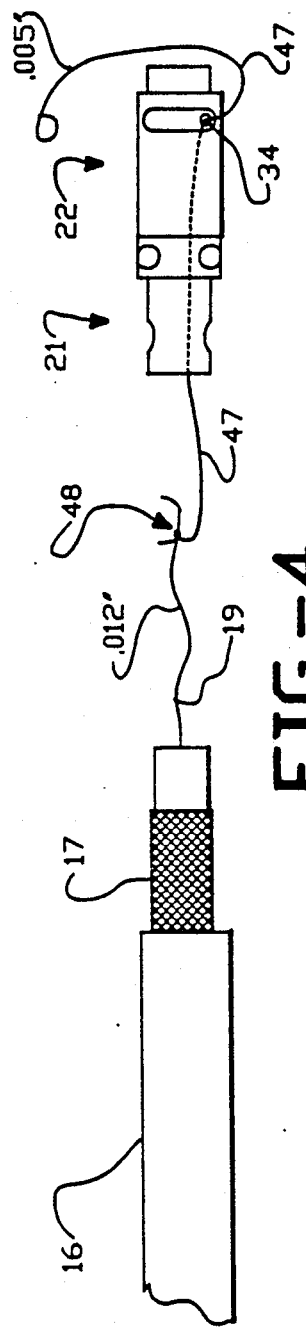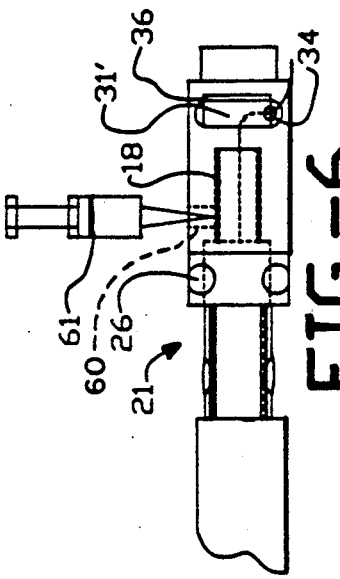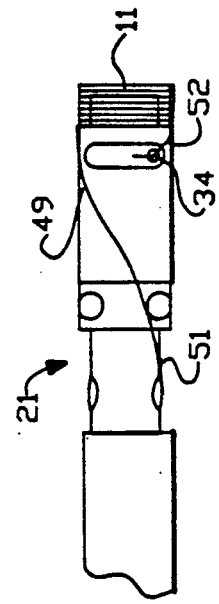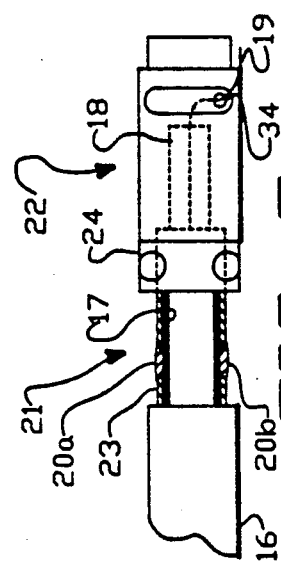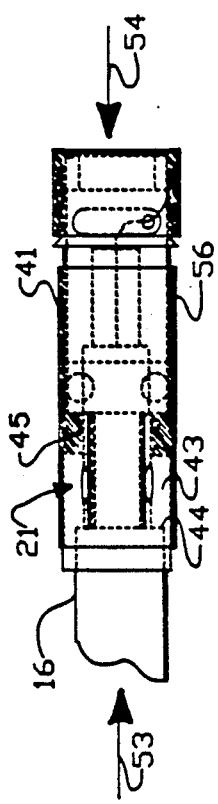

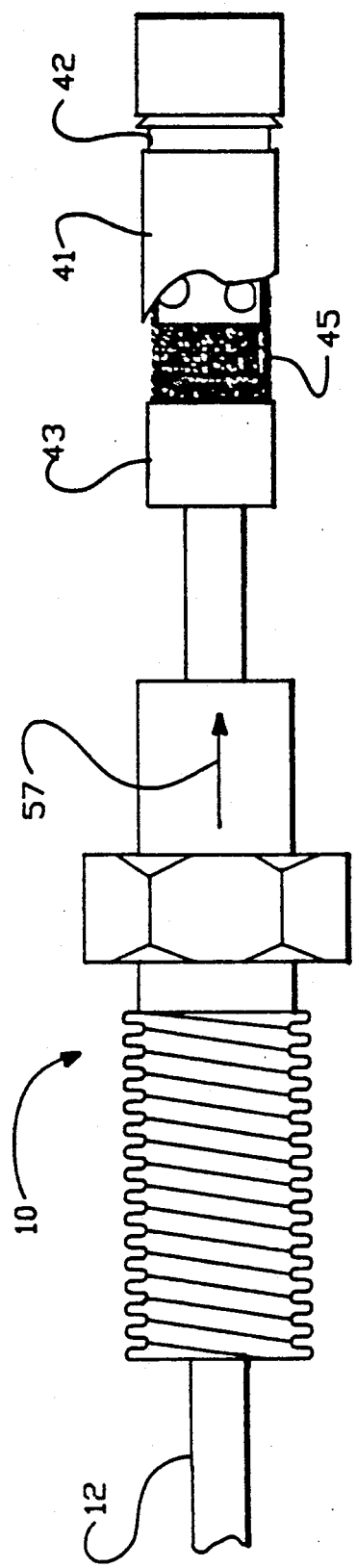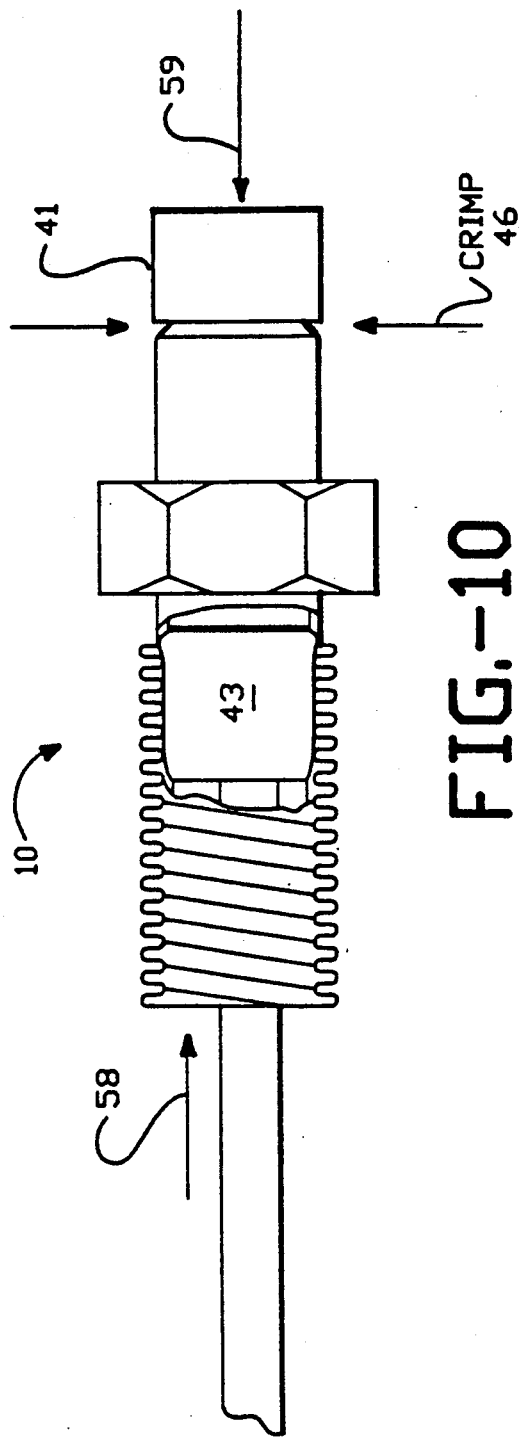
FIG.-9
FIG.-10

PROXIMITY SENSOR RESISTANT TO AXIAL AND TORSIONAL FORCES

The present invention is directed to a proximity sensor, and more specifically to a ruggedized proximity sensor used to sense vibration of rotating machinery.

BACKGROUND OF THE INVENTION

For use in sensing the vibration of shafts, for example, of large rotating machinery, a proximity sensor is utilized. Such sensor has a metal case which contains a sensing coil at one end and has a coaxial cable extending out of the other end of the case for connecting to an electrical processing unit. By well known techniques eccentric movement of the shaft, indicating unwanted vibration, can be sensed. This provides an indication of incipient problems. Such a system with a proximity sensor is at the present time being sold by the assignee of this application, Bently Nevada Corporation of Minden, Nev. The proximity sensor itself is being sold under the trademark "Proximitor."

Such a proximity sensor, in addition to the foregoing, includes a coaxial or even triaxial cable connecting the coil and metal case of the proximity sensor with the electrical processing unit. Because of very adverse ambient conditions, such sensor—besides being resistant to heat and moisture—must withstand mechanical stresses such as pulling or twisting on the coaxial cable. Because of the relatively fine wire (for example, 0.0035" in diameter) of the sensing coil, breakage has sometimes occurred in the past.

OBJECTS AND SUMMARY OF THE INVENTION

It is a general object of the present invention to provide an improved proximity sensor and a method of making such sensor.

In accordance with the above object, there is provided a proximity sensor having a metal case with a sensing coil at one end and a coaxial cable extending out of the other end of the case for connecting to an electrical processing unit. The coaxial cable has an outer insulating jacket and an outer conductor surrounding an inner cylindrical insulator carrying a center conductor. The improved sensor comprises a metal cylinder having two ends and with a predetermined inner diameter. A bobbin of insulating material having an internal cavity of a diameter similar to the inner diameter, and having at a closed end spool means for carrying the sensing coil has its other end mated with one end of the metal cylinder. Means are provided for permanently interlocking the bobbin and metal cylinder to resist axial and torsional forces along the axis of the cylinder and cavity. A portion of the coaxial cable including the outer conductor extends into the metal cylinder with at least the center conductor extending into the cavity of the bobbin. Means are provided for connecting the outer conductor to the metal cylinder for resisting axial and torsional forces. From a process point of view, the bobbin is molded onto one end of the metal cylinder.

BRIEF DESCRIPTION OF DRAWINGS

FIG. 4 is an elevation view illustrating one of the steps of the present invention.

FIG. 5 is a simplified elevation view illustrating another step of the invention and illustrates the proximity sensor in an intermediate form.

FIG. 6 is an elevation view of yet another step of the present invention.

FIG. 7 is an elevation view of another step of the present invention.

FIG. 8 is an elevation view of another step of the invention.

FIG. 9 is an elevation view of another step of the invention showing a metal casing being slid on a coaxial cable.

FIG. 10 is an elevation view of the completed proximity sensor of the present invention which is similar to FIG. 1 but not cut away.

DESCRIPTION OF PREFERRED EMBODIMENT

Figure 1:
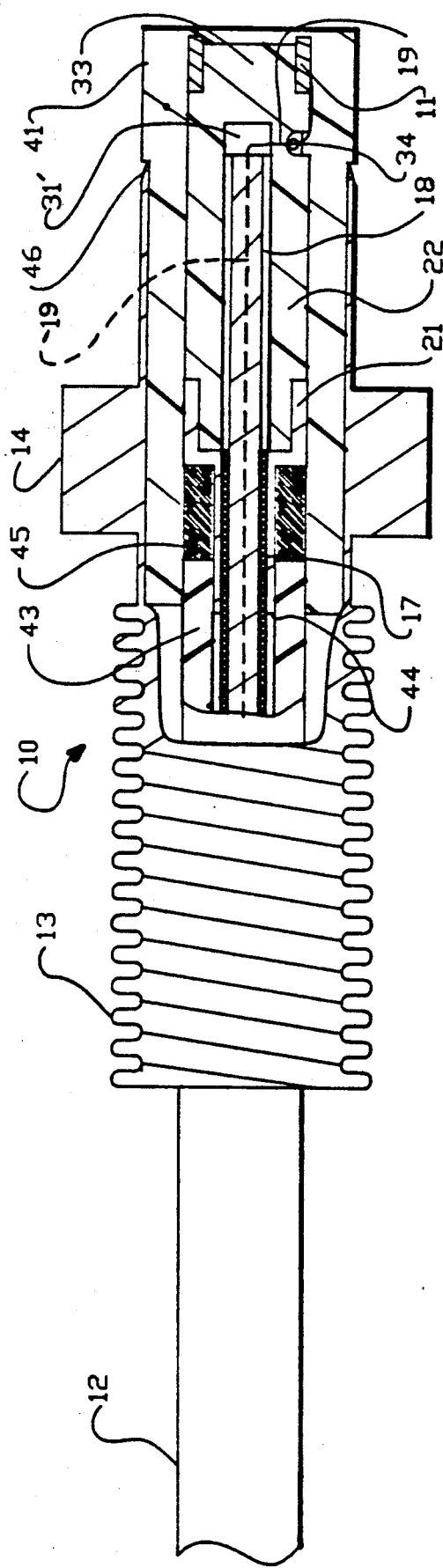
FIG. 1 is an elevation view of a proximity sensor incorporating the present invention which is partially cut away and somewhat simplified.

FIG. 1 illustrates the cutaway view of the proximity sensor of the present invention which, from an overall standpoint, includes a metal case 10 having at one end a sensing coil 11, with a coaxial cable 12 extending out of its other end for connection to an electronic processing unit which is not shown. In general the coil 11 is in proximity to a rotating shaft and a change of position of the shaft from the coil changes the electrical characteristics of coil 11 which are connected to the processing unit via the coaxial cable 12. Such techniques, as discussed above, are well known.

Figure 2:
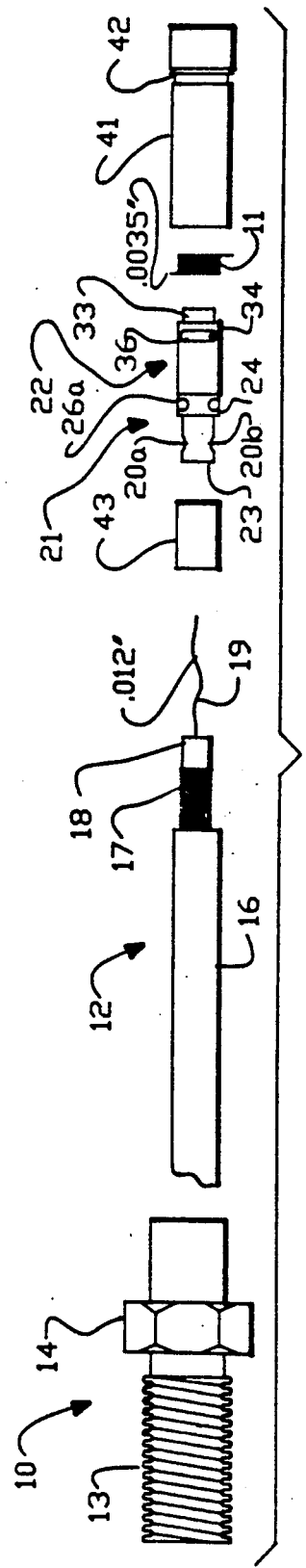
FIG. 2 is an exploded view of FIG. 1.

In view of the severe ambient conditions in which the sensor must operate, the metal casing 10 is relatively rugged and, as better illustrated in FIG. 2, includes a threaded portion 13 and a nut 14 for use in installation. Coaxial cable 12 is standard, including an outer insulating jacket 16 of, for example, Teflon material. A wire braid outer conductor 17 surrounds an inner cylindrical insulator or dielectric 18, which carries a center conductor 19. Such conductor is relatively fragile, being typically of a dimension of 0.012" as used in the present invention. In addition, the coil 11, as illustrated in FIG. 2, is even more fragile, the wire having a typical diameter of 0.0035".

Rather than a coaxial cable, a triaxial type with an additional shield layer may also be used. Also, wire braid outer conductor 17 can be solid. Still referring both to FIGS. 1 and 2, the sensor also includes a metal cylinder of, for example, brass, best shown at 21, which is integrally molded with a plastic insulating bobbin 22. Cylinder 21 has one end 23, which has a predetermined inner diameter and a larger stepped end 24, which includes through its circumference four apertures 26a through 26d.

Figure 3:
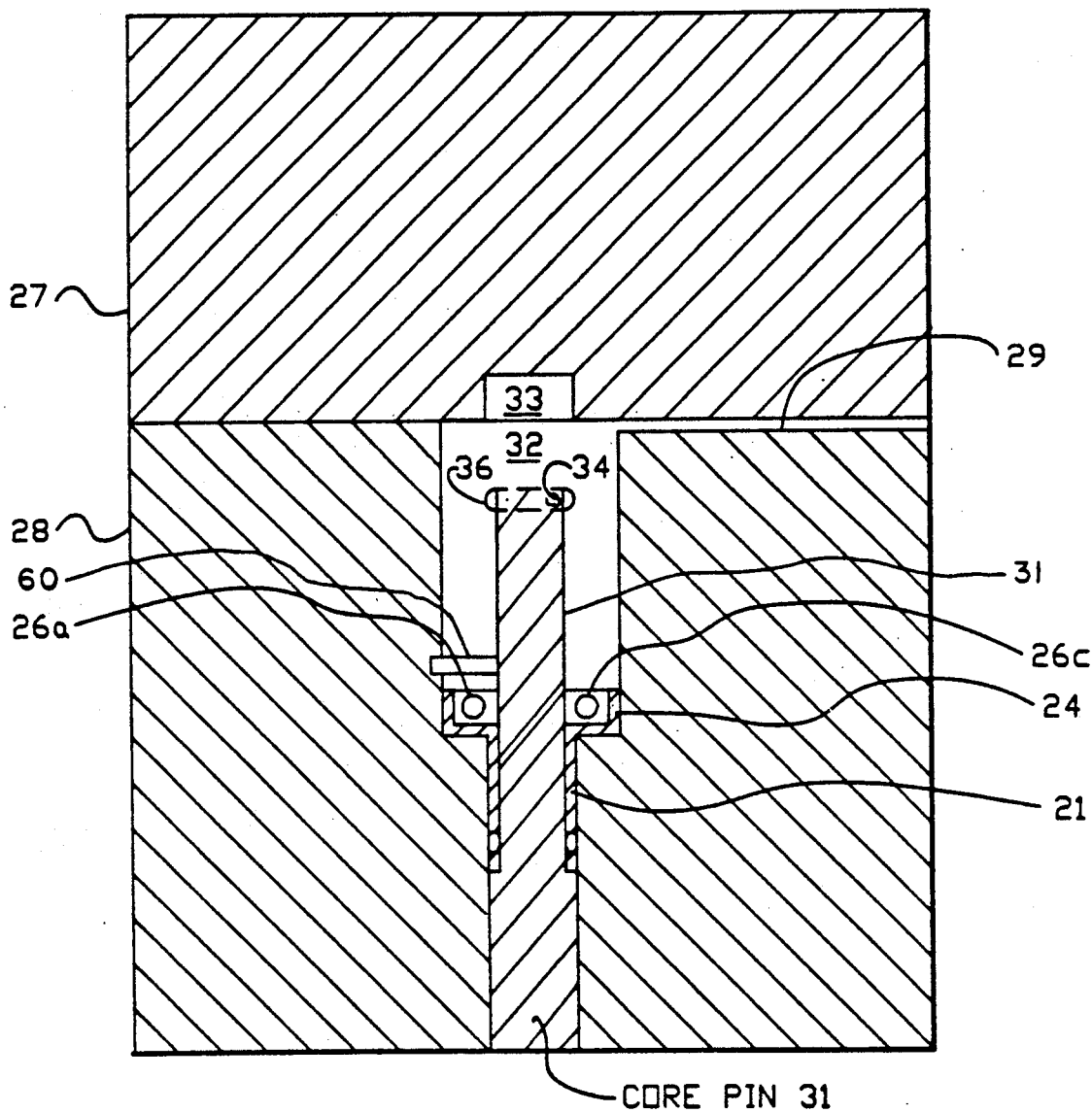
FIG. 3 is the cross-sectional view of the mold used for constructing a portion of the invention and illustrates a part of the process of the present invention.

Referring briefly to FIG. 3, the formation of the integral cylinder-bobbin 21, 22 is illustrated. Cylinder 21 is illustrated in a two piece mold, an upper mold 27 and lower mold 28, with the lower mold having a runner 29 for the plastic material. The bobbin 22 which is to be integrally molded or locked into cylinder 21 at its enlarged end 24 is formed, as illustrated in FIG. 3, to have an inner diameter substantially similar to that of cylinder 21 by means of the core pin 31. In addition, it is formed to have at a closed end 32 a spool 33 for carrying the coil 11 (see FIG. 2).

The bottom mold 28 provides means for forming an aperture 34 through the bobbin which is in an external slot 36. Again, this is also shown in both FIGS. 1 and 2. Such aperture is utilized for connecting the center conductor to the coil. Another channel 60 is provided 180° from 34 which is for the injection of waterproofing silicone rubber to be discussed below.

Finally, it is apparent that the core 31 provides a cavity 31' (see FIG. 1) in the bobbin 22. Into this cavity is inserted the dielectric inner cylindrical insulator 18 of the coaxial cable which, of course, carries the conductor 19.

By molding bobbin 22 onto the enlarged end 24 of cylinder 21 with the use of the apertures 26 having the insulating material extending into such apertures, a very strong one piece unit is formed which effectively resists axial and torsional forces along the axis of the coaxial cable 12, and for that matter, metal cylinder 20 and the cavity 31'.

Referring back to FIGS. 1 and 2, the final two components in constructing the present sensor is the use of a plastic insulating cap 41 having a grooved construction 42 at its end which, by the use of epoxy type glue, is adhered to and covers the cylinder-bobbin combination 21, 22. An elastomeric sleeve 43 is shown in exaggerated length in FIG. 1 and covers the junction shown at 44 between the jacket 16 and the end 23 cylinder 21. As discussed below, this prevents any epoxy used in placing the cap 41 from seeping or "working" by capillary action into the coaxial cable 12 between jacket 16 and braid 17 to thus objectionably stiffen it. Such epoxy also backfills in the space 45 between shoulder or end 24 and sleeve 43 to provide an anchor for cap 41.

Finally, the metal casing 10 is slid onto the coaxial cable 12 and crimped over the slot 42, as shown at 46.

The foregoing was a brief review of the structure and now the detailed process will be described.

Initially (see FIG. 2), the brass cylinder 21 is constructed with its enlarged end 24 having the apertures 26, which will later interlock with the bobbin 22, and also having a pair of apertures 20a and 20b near end 23. The cylinder is effectively interlocked with the bobbin 22 by the technique of molding it together, as illustrated in FIG. 3. Such interlocking occurs at the radial holes 26a-26d. At the same time the spool 33 is formed at its opposite end which will later carry the sensing coil 11.

The coaxial cable 12 as illustrated in FIG. 2 must be trimmed to expose a portion of the inner conductor 19 and the wire braided outer conductor 17. (In some circumstances this might be a flexible solid conductor.) Next, as illustrated in FIG. 4, the outer conductor 17 along with the inner conductor 19 is inserted into metal cylinder 21 and the cavity of bobbin 22. From a practical standpoint, this is done by the use of a fish wire 47 which is extended through the aperture 34 and then looped at 48 around inner conductor 19. Thus, the final structure in FIG. 5 shows the end of conductor 19 extending out of aperture 34 with the jacket 16 of the coaxial cable abutting against the metal cylinder end 23. Also, in dashed outline the inner cylindrical insulator 18 is shown extending into the cavity of the bobbin 22.

To provide a permanent electrical and mechanical attachment between the conductive metal cylinder 21 and the outer conductor 17, solder is applied through the holes 20a and 20b in cylinder end 23 onto the surface of the wire braid outer conductor 17. In addition, a portion of this braid which has been inserted into the cylinder 21 may be tinned for better adhesion. Since the metal cylinder 21 is now an effective electrical portion of outer conductor 17, as briefly illustrated in FIG. 7, the end 49 of the coil 11 may also be soldered at point 51 to metal cylinder 21. At the same time the other end 52 of coil 11 is attached at the aperture 34 to center conductor 19. Thus, the electrical connection between the coil 11 and the coaxial cable is completed.

To prevent unwanted moisture from entering the cavity 31' and also the coaxial cable, a silicone rubber of the "RTV" type is injected (see FIG. 6) into hole 60 molded 180° from aperture 34 by a syringe 61 so that the silicone rubber flows between the inner cylindrical insulator 18 and the bobbin 22 and fills the end of the cavity 31' 'till it flows out of the aperture 34, also filling the elongation 36. This fills any spaces where moisture might accumulate.

As briefly mentioned above in conjunction with FIGS. 1 and 2, an elastomeric sleeve 43 is utilized for protecting the junction 44 between the coaxial cable 16 and its jacket and the metal cylinder 21. Thus, referring briefly to FIG. 9, this sleeve 43 is shown as covering the junction. This is typically a flouro-silicone rubber. In order to cover the entire bobbin cylinder combination 21, 22 and protect the coil 11, as illustrated in FIG. 8, the cap 41 is placed on the interlocked bobbin and metal cylinder. In order to ensure a good adherence, the interior of the plastic cap 41 may be abraded or roughened and partially filled with epoxy type adhesive. Then force is applied at one end, as shown at 53 on the cable and at the other end, as shown at 54 at the end of cap 41 to ensure a good adhesion. The epoxy material is generally indicated along the sides of cap 41 at 56 and extends all the way to the end over the collar 43. However, because the collar extends over the junction 44, unwanted epoxy does not reach the interior of coaxial cable to stiffen it and make it more susceptible to breakage. The backfill at 45 provides an effective anchor to retain cap 41 in place.

The last step in making the proximity sensor of the present invention is illustrated in FIGS. 9 and 10 where the metal casing 10 is slid in the direction (as indicated in FIG. 9) by the arrow 57 over the now in place cap 41 and with force applied at 58 and 59 at the opposite ends of the assembly, crimping occurs at 46 to form the final structure. And with the force applied at 58 and 59 the elastomeric sleeve 43 is deformed so that all spaces are filled and another effective moisture barrier is provided.

The crimping at 46 permanently affixes the metal casing 10 to the cap 41 and overall makes a very strong unitary assembly. Such strength, which in essence locks the coaxial cable 12 to the casing 10 and all of the interior components, is due to the integral molding, as illustrated in FIG. 2, of the bobbin 22 to the metal cylinder 21 and then the soldering of that cylinder to the wire braid coaxial outer conductor 17 of the coaxial cable. And then the cap 41 is firmly attached to the entire structure by the epoxy contact with the bobbin 22, the cylinder 21 and its enlarged end or collar 24 and most importantly the epoxy backfill 45, which abuts against the stepped end 24 to resist axial and torsional forces.

At the same time the sleeve 43, due to its compressibility on the junction 44 (see FIG. 1), between the jacket 16 and the cylinder 21 inhibits moisture and also provides for a seal during the manufacturing process and the application of cap 41 of preventing epoxy by means of capillary action extending up underneath the jacket 16 and hardening and stiffening the cable.

In previous designs shorting, because of water ingression, was sometimes a problem. With the present design the injection of RTV type silicone rubber goes along the length of the dielectric insulating core 18 and prevents the entry of moisture to that portion of the device. In addition, the RTV provides a resilient cushion for the conductor 19, as illustrated in FIG. 1 which, due to axial forces on the coaxial cable 12, when pulled may exhibit some slight motion.

Thus, an improved ruggedized and moisture proof proximity sensor has been provided, along with a unique method of construction of such sensor.

I claim:

1. A proximity sensor having a metal case with a sensing coil at one end and a coaxial cable extending out of the other end of said case for connecting to an electrical processing unit, the coaxial cable having an outer insulating jacket and a wire braid outer conductor surrounding an inner cylindrical insulator carrying a center conductor, the sensor comprising:
   a metal cylinder having one end with a predetermined inner diameter and an enlarged stepped end;
   a bobbin of insulating material having an internal cavity of a diameter similar to said inner diameter, and having at a closed end spool means for carrying said sensing coil, the other end mating with said enlarged stepped end of said metal cylinder;
   means for permanently interlocking said bobbin and metal cylinder for forming a one-piece unitary structure at said enlarged stepped end to resist axial and torsional forces along the axis of said metal cylinder and said cavity;
   a portion of said coaxial cable including said wire braided outer conductor extending into said metal cylinder with at least said center conductor extending into said cavity of said bobbin;
   means for mechanically adhering said outer conductor to said metal cylinder for resisting axial and torsional forces and for providing an electrical connection for said sensing coil;
   means for connecting said center conductor to said coil including an aperture through said bobbin into said cavity;
   and insulating cylindrical cap means adhered to and covering said interlocking bobbin and metal cylinder said cap means including means for mechanically coupling to said metal case to resist axial and torsional forces.

2. A sensor as in claim 1 where said one end of said cylinder acts as a stop for said jacket of said coaxial cable when said outer conductor extends into said metal cylinder.

3. A sensor as in claim 1 where said means for permanently interlocking said bobbin and metal cylinder includes apertures in said enlarged end into which extend said insulating material of said bobbin.

4. A sensor as in claim 1 where said cavity of said bobbin is sealed against moisture by injecting silicone rubber into said cavity.

5. A proximity sensor having a metal case with a sensing coil at one end and a coaxial cable extending out of the other end of said case for connecting to an electrical processing unit, the coaxial cable having an outer insulating jacket and an outer conductor surrounding an inner cylindrical insulator carrying a center conductor, the sensor comprising:
   a metal cylinder having two ends with a predetermined inner diameter;
   a bobbin of insulating material having an internal cavity of a diameter similar to said inner diameter, and having at a closed end spool means for carrying said sensing coil, the other end mating with one end of said metal cylinder;
   means for permanently interlocking said bobbin and metal cylinder for forming a one-piece unitary structure to resist axial and torsional forces along the axis of said metal cylinder and said cavity;
   a portion of said coaxial cable including said outer conductor extending into said metal cylinder with at least said center conductor extending into said cavity of said bobbin;
   and means for mechanically adhering said outer conductor to said metal cylinder for resisting axial and torsional forces.

* * * * *